US010895185B2

(12) United States Patent
Coutier et al.

(10) Patent No.: US 10,895,185 B2
(45) Date of Patent: Jan. 19, 2021

(54) LIQUID DELIVERY MODULE, A METHOD FOR ASSEMBLING SUCH A DELIVERY MODULE AND A TANK SET COMPRISING SUCH A DELIVERY MODULE

(71) Applicant: AKWEL SA, Champfromier (FR)

(72) Inventors: André Coutier, Champfromier (FR); Ludovic Minetto, Romans sur Isere (FR); Christophe Bondran, Saint Uze (FR); Matthieu Bardin, Chatuzange le Goubet (FR)

(73) Assignee: AKWEL, Champfromier (FR)

( * ) Notice: Subject to any disclaimer, the term of this patent is extended or adjusted under 35 U.S.C. 154(b) by 304 days.

(21) Appl. No.: 15/204,598

(22) Filed: Jul. 7, 2016

(65) Prior Publication Data

US 2017/0009625 A1 Jan. 12, 2017

(30) Foreign Application Priority Data

Jul. 10, 2015 (FR) ...................................... 15 56611

(51) Int. Cl.
*F01N 3/20* (2006.01)
*F04B 53/16* (2006.01)
*F04B 17/03* (2006.01)
*F04B 53/00* (2006.01)
*F04B 43/04* (2006.01)
(Continued)

(52) U.S. Cl.
CPC ............. *F01N 3/20* (2013.01); *F01N 3/2066* (2013.01); *F01N 3/2896* (2013.01); *F01N 9/00* (2013.01); *F01N 11/00* (2013.01); *F04B 17/03* (2013.01); *F04B 43/04* (2013.01); *F04B 49/06* (2013.01); *F04B 53/007* (2013.01); *F04B 53/16* (2013.01); *F01N 2610/02* (2013.01); *F01N 2610/14* (2013.01); *F01N 2610/144* (2013.01); *F01N 2610/1406* (2013.01); *F01N 2610/148* (2013.01); *F01N 2610/1433* (2013.01); *F01N 2900/1808* (2013.01);
(Continued)

(58) Field of Classification Search
CPC ........ F01N 3/20; F01N 3/2006; F01N 3/2896; F01N 9/00; F01N 11/00; F01N 2610/1406; F01N 2610/144; F01N 2610/1433; F01N 2610/148; F01N 2900/1808; F01N 2900/1811; F01N 2900/1818; F04B 17/03; F04B 49/06; F04B 53/007; F04B 53/16
See application file for complete search history.

(56) References Cited

U.S. PATENT DOCUMENTS 1,774,662 A * 9/1930 Parks .................... F04B 27/005
417/515
4,058,173 A 11/1977 Carson
(Continued)

FOREIGN PATENT DOCUMENTS

CA 2 172 853 A1 9/1997
DE 102012020039 A1 * 4/2014 ........... F01N 3/2066
(Continued)

*Primary Examiner* — Angelisa L. Hicks
(74) *Attorney, Agent, or Firm* — Oliff PLC (57) ABSTRACT

This delivery module includes: a pump for making the liquid flow; and an electronic circuit for controlling the pump. The delivery module further includes a channeling block having two channeling elements which define, when they are superimposed, channels for the liquid and which include: an inlet channel and an outlet channel.

14 Claims, 6 Drawing Sheets

(51) Int. Cl.
    *F04B 49/06*     (2006.01)
    *F01N 3/28*     (2006.01)
    *F01N 9/00*     (2006.01)
    *F01N 11/00*     (2006.01)

(52) U.S. Cl.
    CPC ............ *F01N 2900/1811* (2013.01); *F01N 2900/1818* (2013.01); *Y02T 10/12* (2013.01)

(56) References Cited

U.S. PATENT DOCUMENTS

| | | | | |
|---|---|---|---|---|
| 6,102,684 A | * | 8/2000 | Tuckey | F02M 37/04 418/15 |
| 2004/0101427 A1 | * | 5/2004 | Yu | F04C 2/102 418/15 |
| 2005/0265860 A1 | * | 12/2005 | Kameya | F04C 2/086 417/410.4 |
| 2006/0070264 A1 | | 4/2006 | Lachance et al. | |
| 2010/0107615 A1 | * | 5/2010 | Chmielewski | F01N 3/2066 60/303 |
| 2011/0311373 A1 | * | 12/2011 | Garcia-Lorenzana | F04C 2/10 417/53 |
| 2013/0000743 A1 | | 1/2013 | Crary | |
| 2013/0025269 A1 | * | 1/2013 | Hodgson | F01N 3/2066 60/317 |
| 2015/0267588 A1 | * | 9/2015 | Treudt | F01N 3/2066 60/295 |

FOREIGN PATENT DOCUMENTS

FR         2 971 006 A1     8/2012
KR     101 158 262 B1     6/2012

* cited by examiner

LIQUID DELIVERY MODULE, A METHOD FOR ASSEMBLING SUCH A DELIVERY MODULE AND A TANK SET COMPRISING SUCH A DELIVERY MODULE

The present invention concerns a delivery module for delivering a liquid from a tank toward a downstream conduit, for example for delivering an aqueous urea solution in a motor vehicle. In addition, the present invention concerns an assembly method for assembling such a delivery module. Moreover, the present invention concerns a tank assembly comprising such a transfer device and a tank configured to contain the liquid.

The present invention is applied to the field of tank assemblies comprising a module for delivering the liquid out of the tank. In particular, the present invention may be applied to the field of motor vehicles comprising such a tank assembly. More particularly, the present invention may be applied to a tank of an aqueous urea solution, such as a solution referred to by the trademark AdBlue™. By motor vehicle, are meant, in particular, passenger vehicles, commercial vehicles, agricultural machines or industrial vehicles for example of the truck-type.

US2013000743A1 describes a delivery module comprising hydraulic actuators, hydraulic sensors and an electronic circuit connected to the hydraulic actuators and to the hydraulic sensors.

However, the hydraulic actuators and the sensor are fluidly connected by several short hose sections. Hence, the assembly of the delivery module of US2013000743A1 requires long and numerous assembly operations, which increases the risks of error and the cost.

Moreover, in some delivery modules of the state of the art, such as in FR2971006A1, the delivery module comprises components having complex geometries in order to enable implanting the hydraulic sensors and actuators. Hence, the assembly of the delivery module of FR2971006A1 requires numerous movements, in particular multiple rotations.

The present invention aims in particular to solve all or part of the aforementioned problems.

To this aim, an object of the present invention is a delivery module, for delivering a liquid, for example an aqueous urea solution, from a tank toward a downstream conduit in a motor vehicle, the delivery module comprising at least:
  a pump configured to make the liquid flow from the tank toward the downstream conduit; and
  an electronic circuit connected to the pump and configured to control the pump,
the delivery module being characterized in that it further comprises a channeling block, the channeling block comprising two channeling elements which are configured to define, when they are superimposed, at least two channels adapted for the circulation of the liquid, the channels including at least: i) an inlet channel configured to channel the liquid toward the pump, and ii) an outlet channel configured to channel the liquid coming out from the pump.

During a purge of the hydraulic components, in order to evacuate the liquid, it is possible to make the liquid flow in the reverse direction, so that, during a short time period, the inlet (or intake) channel channels the liquid coming out from the pump and the outlet (or discharge) channel channels the liquid toward the pump.

Thus, such a delivery module may be assembled without any hose section, because the channels defined between the channeling elements allow fluidly connecting the pump on the one hand to the tank and on the other hand to the downstream conduit. In practice, all it needs is to superimpose the channeling elements in order to form the channeling block and thus join the pump. Hence, the assembly of such a delivery module is particularly simple, which allows reducing the risks of errors and the cost of the delivery module.

According to one variant, the channeling elements are superimposed along a superimposition direction, the superimposition direction being orientated in any direction when the delivery module is assembled in a tank assembly which in turn is fastened on the motor vehicle.

According to one variant, the pump may be selected in the group constituted of a gear pump, a diaphragm pump and a peristaltic pump.

According to one embodiment, one of the channeling elements presents at least one cavity configured to define at least one of the channels, and another channeling element is configured to seal said cavity when the channeling elements are superimposed.

According to one variant, the channeling elements have respective cooperating surfaces which face each other when the channeling elements are superimposed. In this variant, a cooperating surface of one of the channeling elements is superimposed with a cooperating surface of another one the channeling elements. In this variant, each of the cooperating surfaces may be partially or completely planar.

According to one variant, one of the channeling elements presents at least two cavities configured to define said at least two channels, and another one of the channeling elements is configured to seal these cavities when the channeling elements are superimposed. In other terms, each of the channels has walls formed by a cavity located on the same channeling element, while another one of the channeling elements forms a cap covering each cavity.

Alternatively to this variant, a channel has walls formed by a cavity located in one of the channeling elements and another channel has walls formed by a cavity located in another one of the channeling elements.

According to one variant, at least one channeling element includes weld beads respectively arranged around a cavity. Thus, such weld beads allow sealing the channels, because the other channeling element may bear against the weld beads so as to close the channels in a liquid-tight manner. In particular, each channeling element includes at least one weld bead, and these weld beads may be secured to each other by welds resulting from a warm-up of the material of the weld beads.

The welding of the weld beads present on the channeling elements produces weld mounds. This welding may be carried out according to the following steps: i) local warming of the material of the channeling elements, ii) interpenetration of the warmed-up materials, and then iii) cooling of the warmed-up material.

Alternatively, the channeling elements may be assembled by a bond. The bond may be arranged around the channels in a liquid-tight manner. For example, the bond may form an extra thicknesses similar to weld beads.

According to one variant, at least one of the channeling elements comprises at least two assembled portions. For example, a channeling element may comprise a support portion and a channeling portion which is arranged on the support, the channeling portion having at least one cavity configured to define at least one of the channels. In this variant, the support portion may have generally the shape of a plate and the channeling portion may have generally the shape of an insert assembled to this plate, for example simply set on this plate. The delivery module may further comprise sealing members configured to achieve sealing between the channeling portion and the support portion.

According to one embodiment, each channeling element has generally the shape of a plate.

Thus, such channeling elements in the form of plates are particularly simple to superimpose in order to form the channeling block.

According to one variant, the ratio between i) the thickness of one of these channeling elements in the form of plates and ii) a dimension perpendicular to this thickness may be comprised between 1% and 30%.

According to one variant, at least one channeling element in the form of a plate has a generally circular shape.

Alternatively to the preceding embodiment, the channeling elements may have a complex and non-flat geometry, for example a three-dimensional shape with curved portions and/or angular portions.

According to one embodiment, at least one channeling element is formed by a flat gasket having at least one opening defining one of the channels, the delivery module further comprising at least one retaining member configured to retain the flat gasket.

Thus, such a flat gasket and such a retaining member allow for a rapid assembly. The or each opening may be formed by a cut-out in the flat gasket. The or each opening may pass or not through the flat gasket.

According to one variant, the flat gasket presents several openings defining respective channels.

According to one variant, the delivery module comprises one single flat gasket presenting opening defining all channels.

Alternatively to this variant, the delivery module comprises several flat gaskets, each flat gasket presenting at least one opening defining at least one respective channel.

According to one embodiment, at least one channeling element includes at least one protruding rim defining a closed contour.

Thus, such a protruding rim allows defining the channel in a liquid-tight manner. The or each protruding rim may be integral with the channeling element, which simplifies the assembly of the delivery module.

According to one variant, the delivery module comprises a weld arranged so as to secure, directly or indirectly, said at least one protruding rim to the other channeling element.

Alternatively to a weld, the delivery module comprises a bond which is arranged around the channels in a liquid-tight manner so as to secure, directly or indirectly, said at least one protruding rim to the other channeling element.

Still alternatively, the delivery module comprises at least one generally annular-shaped gasket arranged around the location of a respective channel. For example, the or each gasket may be overmolded on a channeling element.

According to one variant, a channeling element presents planar portions defining the bottoms of the channels, each protruding rim extending over a respective planar portion. In other terms, each protruding rim and the corresponding planar portion define a recess or a cavity which forms a channel. When the delivery module is in the assembled configuration, the other channeling element may bear against the protruding rim so as to close the channels in a liquid-tight manner.

According to one variant, each channeling element includes at least one protruding rim, protruding rims of a channeling element cooperating with the protruding rims of the other channeling element so as to form the channels.

According to one embodiment, the delivery module further comprises at least one valve, the channels including a channel configured to channel the liquid toward the valve.

According to one variant, the valve is a valve fluidly controlled by the pressure of a fluid, for example by the pressure of the liquid, so as to enable or prevent, selectively, the circulation of the liquid in the delivery module. Alternatively, the valve may be a solenoid valve. In this variant, the electronic circuit may be connected to the solenoid valve so as to control it. According to variants, the valve may be a component of a pump or of check valve the opening of which may be controlled, hydraulically or electrically.

According to one variant, the delivery module may further comprise an accumulator, the channels including a channel configured to channel the liquid toward the accumulator.

According to one variant, the electronic circuit is electrically connected to the accumulator in order to supply electric power to a heating component configured to heat the product, liquid or solid, present in the accumulator. According to one variant, the delivery module may further comprise several hydraulic components, for example several pumps, several valves and/or several accumulators, the channels including channels configured to channel the liquid toward these pumps, toward these valves and/or toward these accumulators.

According to one embodiment, the delivery module further comprises a hydraulic sensor configured to generate measurement signals which are representative of a characteristic property of the liquid, the electronic circuit being connected to the hydraulic sensor so as to receive the measurement signals, the channels including a measurement channel configured to channel the liquid toward the hydraulic sensor.

According to one variant, the delivery module may comprise several hydraulic sensors, the channels including channels configured to channel the liquid toward the hydraulic sensors. The delivery module may comprise at least one fastening member configured to fasten the hydraulic sensor(s) to at least one channeling element.

In this variant, the or each hydraulic sensor is selected in the group consisting of a pressure sensor, a temperature sensor and/or a chemical concentration sensor. A chemical concentration sensor, which may be called a quality sensor, has in particular the function of measuring a property representative of the chemical concentration of the liquid. Thus, the or each hydraulic sensor allows controlling at least one characteristic parameter of the liquid; for example the temperature, the pressure, the concentration, etc.

According to one embodiment, the delivery module further comprises a joining member arranged to join the pump to the inlet channel so that the liquid can flow from the inlet channel toward the pump through the joining member.

According to one variant, the joining member is secured to the pump, at least one channeling element presenting at least one through hole which opens into the inlet channel so that the joining member extends completely or partially in said at least one through hole. In other terms, the pump includes a male shape, while the channeling element includes a female shape.

According to one variant, the joining member has generally a tubular shape.

Thus, the cooperation of such a joining member and of such a through hole allows for a simple assembly, because all it needs is to introduce the joining member in the through hole in order to fluidly connect the pump. For example, the through hole may be substantially rectilinear, which allows for an assembly by simple stacking.

Alternatively to this variant, the joining member is fast with a channeling element, the pump having a receiver configured to house an end of the joining member. In other terms, the pump includes a female shape, while the channeling element includes a male shape.

In one variant where the delivery module comprises several hydraulic components, the delivery module may comprise several joining members and several through holes cooperating together so as to join the hydraulic components.

According to one variant, the delivery module further comprises at least one sealing gasket configured to seal the joint between the joining member and said at least one through hole. In particular, said at least one sealing gasket is an O-ring gasket, with a circular section or without. Alternatively to this variant, said at least one sealing gasket is a bellow.

According to one embodiment, the pump has a primary connecting member, and the electronic circuit has a secondary connecting member, the primary connecting member and the secondary connecting member being configured to be in contact when they are superimposed after superimposition along a superimposition direction, so that an electric current flows between the electronic circuit and the pump.

Thus, the electronic circuit may supply electric power to the pump, while having a rapid assembly and without any risk of error. Indeed, an operator can simply superimpose the primary and secondary connecting members so as to bring them into contact. In a delivery module of the state of the art, the electrical links between the electronic circuit and the pump require several short electrical harnesses with the corresponding welds.

According to one variant, the primary connecting member defines a male shape and the secondary connecting member defines a female shape. Alternatively to this variant, the secondary connecting member has a male shape and the primary connecting member has a female shape.

According to one variant, the primary connecting member and/or the secondary connecting member may comprise a brush, a plug, a press-fit connection, a spring or a leaf spring.

Alternatively to these variants, the primary connecting member presents a primary terminal surface and the secondary connecting member presents a secondary terminal surface, the primary and secondary terminal surfaces being linked in a punctual manner, in a linear manner or in a planar manner.

According to one variant, the channeling block has a passage opening opposite the secondary connecting member so that the primary connecting member passes through the passage before entering into contact with the secondary connecting member. In this variant, the pump may be placed at the other side of the channeling block with respect to the electronic circuit. In other terms, the electrical components of the pump are electrically connected to the electronic circuit by a direct connection through the channeling elements.

When the delivery module comprises a hydraulic sensor or several hydraulic actuators (accumulator, valves, etc.), the channeling block may have several passages, the electronic circuit may have several secondary connecting members, and the hydraulic sensor may have at least one tertiary connecting member configured to pass through a respective passage and to enter into contact with a secondary connecting member.

According to one embodiment, the pump is located between the electronic circuit and the channeling block.

In this embodiment, the pump is close to or in contact with the electronic circuit. Thus, such an arrangement avoids the need to form passages in the channeling block for the passage of said at least one primary or secondary connecting member.

In the variant where the delivery module comprises several hydraulic components, some hydraulic components may be located between the electronic circuit and the channeling block, whereas other hydraulic components may be located at the side of the electronic circuit or at the side opposite to the electronic circuit with respect to the channeling block.

Alternatively, all hydraulic components may be located between the electronic circuit and the channeling block.

A hydraulic sensor may possibly be located at the side of the electronic circuit or at the side opposite to the electronic circuit with respect to the channeling block.

According to one variant, the delivery module further comprises a housing arranged at least partially around the electronic circuit. Thus, such a housing allows protecting the electronic circuit from possible impacts or from pollution by the liquid or by another substance.

According to one variant, each channeling element is composed of a thermoplastic material, selected for example in the group constituted of a polyoxymethylene (POM), a polyamide (PA), a polypropylene (PP), a polyethylene (PE). Thus, each channeling element may have a complex geometry, a low weight and a reduced cost. In addition, each channeling element may be manufactured by injection molding, which allows forming the channels directly, for example by forming at least one cavity and/or at least one protruding rim.

According to one embodiment, the delivery module further comprises at least one guiding member configured to guide each channeling element toward an assembled position.

Thus, such a guiding member facilitates the assembly of the delivery module, by allowing guiding the components of the delivery module relative to each other during the assembly. After this guiding, the components are properly positioned with respect to each other.

Alternatively, guiding of the components of the delivery module may be performed by guiding elements belonging to the assembly device of the delivery module.

In the variant where the delivery module comprises several hydraulic components (accumulator, valves, etc.), at least one of the channeling elements has several guiding members configured to guide several hydraulic components toward theirs assembled positions.

According to one variant, at least one guiding member is formed by a lug and at least one guiding member is formed by a receiver complementary to the lug.

According to one variant, the delivery module comprises a fastening member configured to fasten the pump to the channeling block. Thus, such a fastening member facilitates the assembly of the delivery module.

According to one variant, the delivery module further comprises at least one guiding member configured to guide the pump and/or the electronic circuit toward an assembled position.

For example, the delivery module comprises screws, for example self-drilling screws, which are arranged so as to fasten the pump to the channeling block. The self-drilling screws may be screwed parallel to the superimposition direction.

Alternatively to this example, the fastening member may comprise an elastically-resilient element configured to snap-fit with a complementary element secured to the pump.

In particular, each fastening member may be selected in the group constituted of an elastic snap-fit member, a weld, an internal thread, an external thread, a rivet, a bond, a dowel, a staple.

In the variant where the delivery module comprises a hydraulic sensor, at least one of the channeling elements may comprise a fastening member configured to fasten the hydraulic sensor to a channeling element.

When the delivery module comprises several hydraulic sensors, at least one of the channeling elements may comprise several fastening members configured to fasten the hydraulic sensors to the channeling elements.

According to one variant, the delivery module further comprises securing portions configured to secure the delivery module and the tank.

According to one variant, the delivery module further comprises a fitting configured to fluidly connect an outlet of the delivery module to the downstream conduit conveying the liquid toward other members.

In addition, an object of the present invention is an assembly method, for assembling a delivery module, the assembly method comprising at least the steps of:
  providing a delivery module according to the invention,
  orientating the channeling elements so as to position the channels,
  superimposing the channeling elements along a superimposition direction so as to form the channeling block, and
  stacking the pump along the superimposition direction.

Thus, such an assembly method is simple and rapid, which allows reducing the risks of error and the cost of the delivery module. In practice, all it needs is to superimpose or stack the channeling elements through a simple and rapid movement.

According to one variant, the assembly method further comprises an initial step consisting in setting a channeling element on a horizontal surface, the superimposition direction being vertical.

According to one variant, the pump has a primary connecting member, and the electronic circuit has a secondary connecting member, the assembly method further comprises a step consisting in superimposing the primary connecting member and the secondary connecting member along a superimposition direction, so as to bring the primary connecting member and the secondary connecting member into contact, so that an electric current flows between the electronic circuit and the pump.

According to one embodiment, the delivery module comprises the aforementioned joining member, the pump comprises the aforementioned primary connecting member and the electronic circuit comprises the aforementioned secondary connecting member, the channeling block presents a passage passing through each of the channeling elements, the assembly method further comprising the steps of:
  joining the pump to the inlet channel and to the outlet channel via said at least one joining member so that the liquid can flow from the inlet channel toward the pump through the joining member and the liquid can flow from the pump toward the outlet channel through the joining member,
  passing said at least one primary connecting member through the passage, and
  bringing said at least one primary connecting member and said at least one secondary connecting member into contact.

These passage, insertion and introduction steps are carried out by translating respectively the or each brush along the superimposition direction. Thus, such an assembly method is particularly simple and rapid, which allows reducing the risks of error and the cost of the delivery module. Indeed, most of the mechanical, hydraulic and electrical components of the delivery module are assembled by simple stacking or nesting along the superimposition direction. In practice, all it needs is to superimpose, and therefore stack, the mechanical, hydraulic and electrical components on the channeling elements through a simple and rapid stacking movement.

According to one variant, the steps of this embodiment may be permuted. For example:
  introducing said at least one joining member in the through hole in order to join said at least one pump, and
  inserting said at least one brush in an insertion hole.

Moreover, an object of the present invention is a tank assembly, for storing a liquid, for example an aqueous urea solution in a motor vehicle, the tank assembly comprising:
  a tank configured to contain the liquid, the tank having a bottom presenting i) a bottom opening configured for the passage of the liquid and ii) a protruding portion which is shaped protruding inwardly of the tank so as to define a cavity external to the tank under said protruding portion,
  a delivery module according to the invention, the delivery module being placed at least partially in the external cavity so that the pump is fluidly connected to the bottom opening.

At least one intermediate component may be disposed between the pump and the bottom opening. According to one variant, the pump may be joined, throughout the bottom opening, to a hydraulic component located inside the tank. In this variant, the pump remains fluidly connected to the bottom opening since the liquid necessarily passes through the bottom opening.

Moreover, an object of the present invention is a motor vehicle comprising such a tank assembly.

The embodiments and the variants mentioned hereinbefore may be considered separately or according to any technically possible combination.

The present invention will be better understood and its advantages will appear in the light of the description that follows, given only as a non-limiting example and made with reference to the appended schematic figures, in which identical reference numerals correspond to structurally and/or functionally identical or similar elements. In the appended schematic figures.

Figure 9:
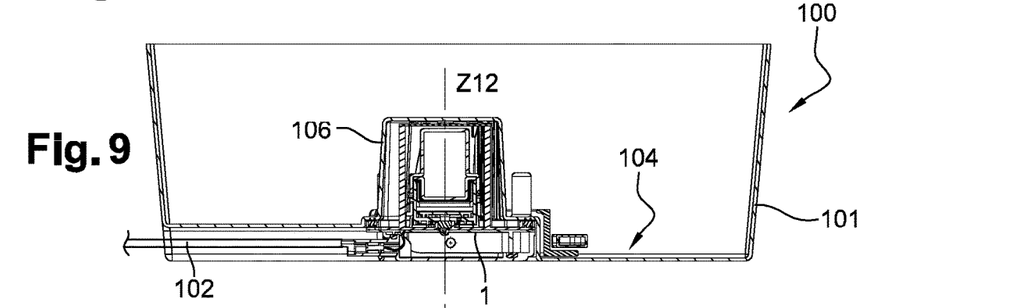
FIG. 9 is a section of a tank assembly in accordance with the invention and comprising the delivery module of FIG. 8.
Figures 10, 11:
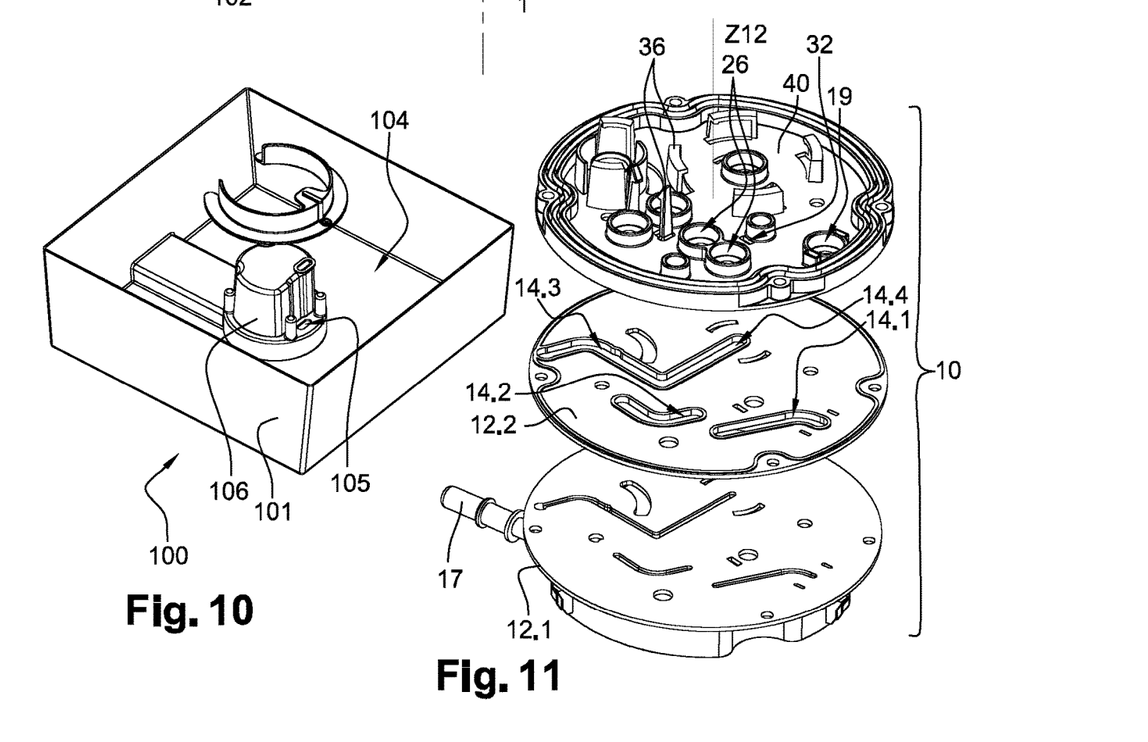
FIG. 10 is a partially-exploded perspective view of the inside of a tank belonging to the tank assembly of FIG. 9.
FIG. 11 is an exploded perspective view of a channeling block of a delivery module in accordance with a third embodiment of the invention.
Figure 13:
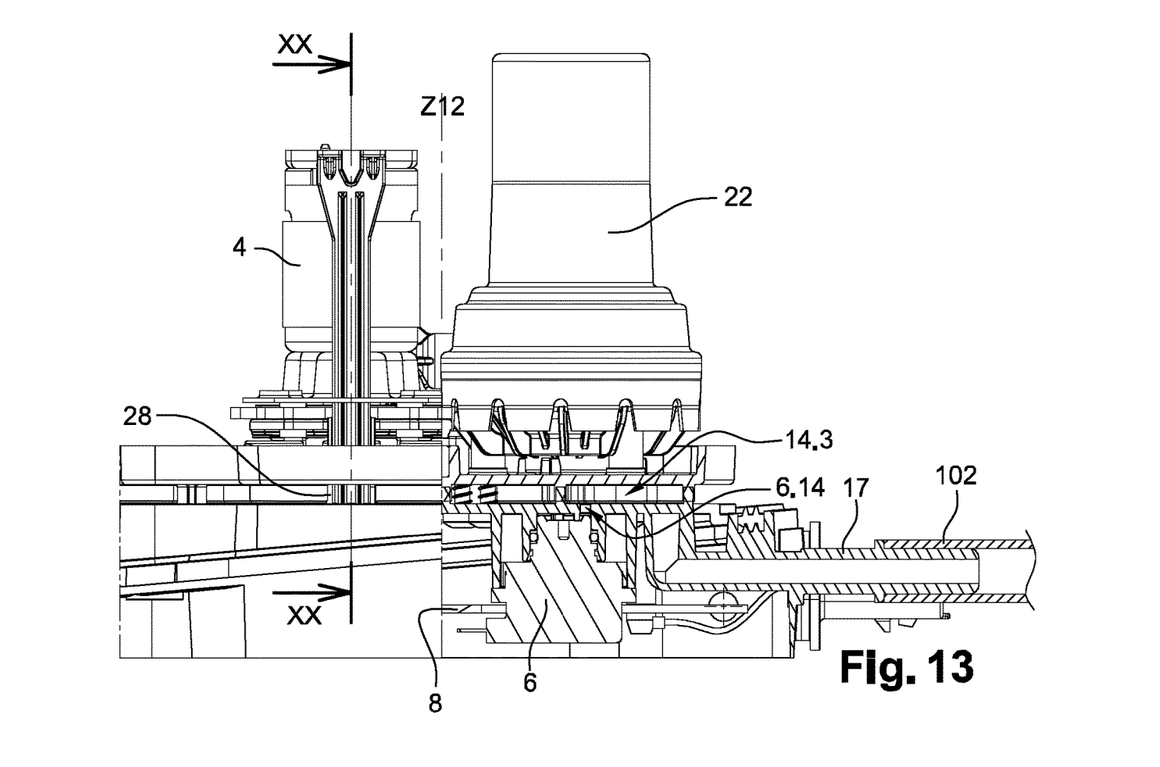
FIG. 13 is a partial section, along the half-plane XIII in FIG. 12, of a delivery module of FIG. 12.

FIGS. 1 to 7 illustrate a delivery module 1 which has in particular the function of delivering an aqueous urea solution in a motor vehicle, from a tank 101 similar to that represented in FIGS. 9 and 10 for the second embodiment, toward a downstream conduit 102, similar to that represented in FIG. 9 for the second embodiment and in FIG. 13 for the fourth embodiment. The delivery module 1 herein is placed in a lower region of the tank 101 and under a wall forming the bottom of the tank 101.

Figures 1, 8:
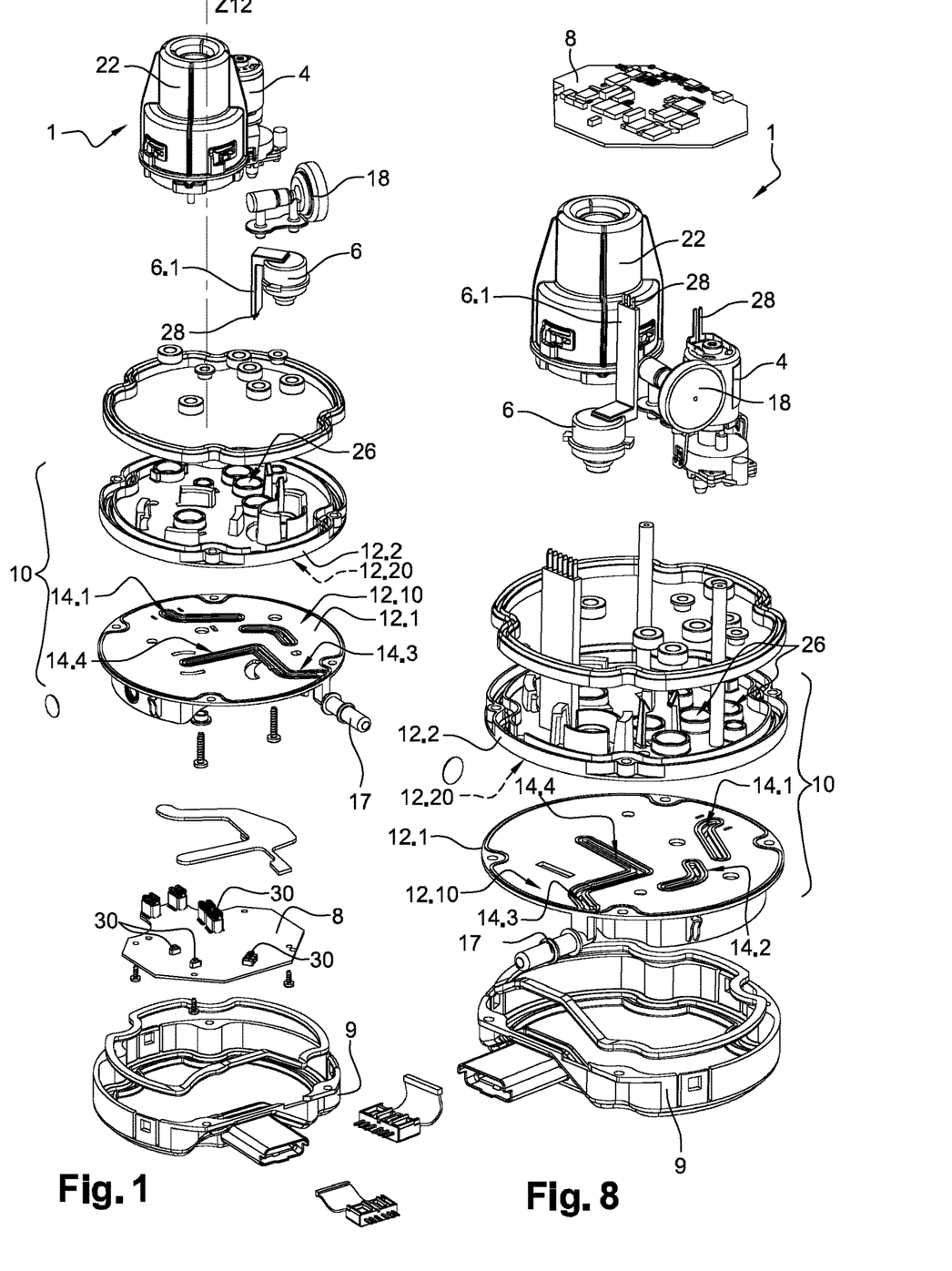
FIG. 1 is an exploded perspective view of a delivery module in accordance with a first embodiment of the invention.
FIG. 8 is an exploded perspective view, at an angle different from FIG. 1, of a delivery module in accordance with a second embodiment of the invention.

The delivery module 1 comprises a pump 4 which is configured to make the liquid flow from the tank 101 toward the downstream conduit 102. The delivery module 1 further comprises an electronic circuit 8 which is connected to the pump 4 and which is configured to control the pump 4.

The delivery module 1 further comprises a housing 9 which is arranged around the electronic circuit 8 and the channeling block. Thus, the housing 9 allows protecting the electronic circuit 8 from possible impacts or from pollution by the liquid or by another substance.

In addition, the delivery module 1 comprises a channeling block 10. The channeling block 10 comprises two channeling elements 12.1 and 12.2. The channeling elements 12.1 and 12.2 are configured to be superimposed along a superimposition direction Z12. The superimposition direction Z12 is orientated substantially vertically when the delivery module 1 is in service, that is to say when the delivery module 1 is assembled in the tank assembly 100 which in turn is fastened on the motor vehicle when in service. When in service, the channeling element 12.1 is located below and the channeling element 12.2 is located atop.

Figures 2, 4, 5, 6, 7:
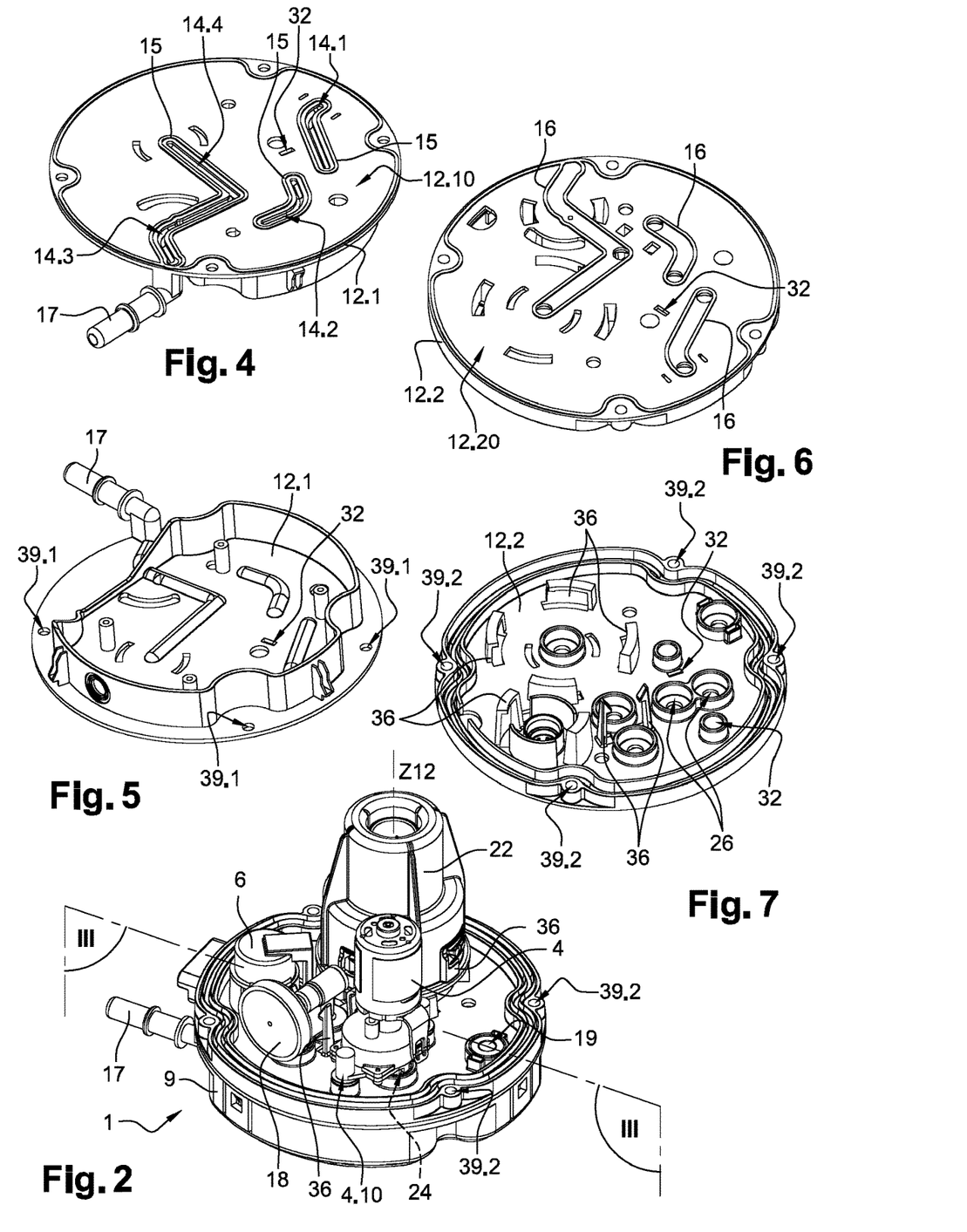
FIG. 2 is an assembled perspective view of a portion of the delivery module of FIG. 1.
FIG. 4 is a perspective view of the upper face of a channeling element belonging to the delivery module of FIG. 1.
FIG. 5 is a perspective view of the lower face of the channeling element of FIG. 4.
FIG. 6 is a perspective view of the lower face of another channeling element belonging to the delivery module of FIG. 1.
FIG. 7 is a perspective view of the upper face of the channeling element of FIG. 6.
Figure 3:
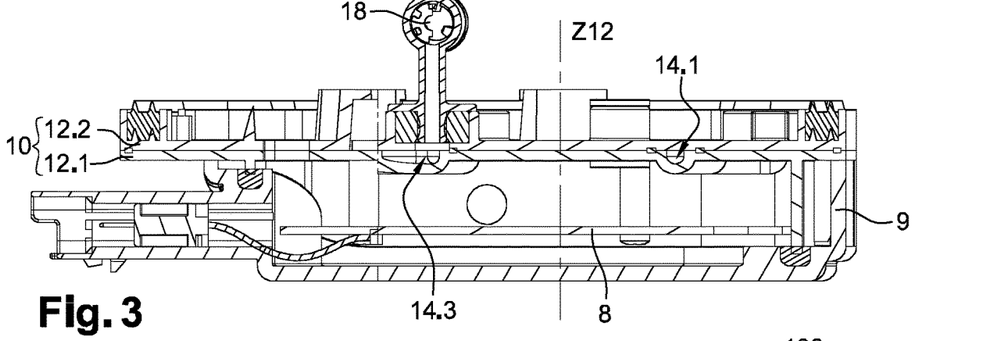
FIG. 3 is a section, along the plane III in FIG. 2, without the pump.

The channeling elements 12.1 and 12.2 are configured to define, when they are superimposed, channels adapted for the circulation of the liquid. As shown in FIGS. 1 and 4, the channeling elements 12.1 and 12.2 herein are configured to define three channels 14.1, 14.2 and 14.3. These three channels herein include an inlet channel 14.1 and an outlet channel 14.2. The inlet channel 14.1 is configured to channel the liquid toward the pump 4. The outlet channel 14.2 is configured to channel the liquid coming out of the pump 4.

As shown in FIG. 1, the lowest (12.1) of the channeling elements 12.1 and 12.2 presents three bent cavities. Each cavity is configured to define one of the channels 14.1, 14.2 and 14.3. The highest (12.2) of the channeling elements 12.1 and 12.2 is configured to seal each cavity when the channeling elements 12.1 and 12.2 are superimposed. Hence, each of the channels 14.1, 14.2 and 14.3 has walls formed by a respective cavity located on the channeling element 12.1, while the other channeling element 12.2 forms a cap covering each cavity.

As shown in FIGS. 4 to 7, each channeling element 12.1 and 12.2 herein has generally the shape of a generally circular-shaped plate. Since the channeling elements 12.1 and 12.2 are arranged in a concentric manner, the channeling block 10 has generally the shape of a cylinder.

The channeling elements 12.1 and 12.2 have respective cooperating surfaces 12.10 and 12.20 which are generally planar and which face each other when the channeling elements 12.1 and 12.2 are superimposed. In practice, the cooperating surface 12.10 of the channeling element 12.1 covers, at a small distance, the cooperating surfaces 12.20 of the other channeling element 12.2.

As shown in FIGS. 4 and 6, he channeling element 12.1 includes weld beads 15 arranged around the cavities delimiting the channels 14.1, 14.2 and 14.3. Similarly, the channeling element 12.2 includes weld beads 16 arranged around locations delimiting the channels 14.1, 14.2 and 14.3. The weld beads 15 and 16 allow sealing the channels, after having superimposed the channeling elements 12.1 and 12.2 and secured together the weld beads 15 and 16 by welds resulting from a warm-up of the material of the weld beads 15 and 16.

The delivery module 1 further comprises a fitting 17 configured to fluidly connect an outlet of the delivery module 1 to the downstream conduit 102 conveying the liquid toward other members of the motor vehicle. In addition, the delivery module 1 has an inlet 19 for fluidly connecting the delivery module 1 to the tank 101. The inlet 19 herein is formed by an orifice surrounded by an O-ring gasket.

The delivery module 1 further comprises a valve 18 arranged so as to enable or prevent the circulation of the liquid in the delivery module 1. The valve 18 herein is a valve fluidly controlled by the pressure of the liquid. The channels include a channel 14.4 configured to channel the liquid from the valve 18 toward an accumulator 22 belonging to the delivery module 1.

When the delivery module 1 is in service, the valve 18 successively presents a normal passage position and a reverse passage position.

The valve 18 is placed in the normal passage position at the pressure of a hydraulic control. In this normal passage position, the valve 18 enables the passage of the liquid which comes from the pump 4 (upstream portion of the liquid circuit) and which flows toward the accumulator 22 and the hydraulic sensor 6 (downstream portion of the liquid circuit).

The valve 18 is placed in the reverse passage position, in the presence of a negative relative pressure (lower than the atmospheric pressure) of the hydraulic control. In this reverse passage position, the valve 18 enables the passage of the liquid which comes from the accumulator 22 and the hydraulic sensor 6 (downstream portion of the liquid circuit) and which flows toward the pump 4 (upstream portion of the liquid circuit). This reverse passage position serves in particular during the phases of purging the tank assembly 100 and the delivery module 1.

The delivery module 1 further comprises a hydraulic sensor 6. The hydraulic sensor 6 is configured to generate measurement signals which are representative of a characteristic property of the liquid. In the example of the figures, the hydraulic sensor 6 is a pressure sensor, for measuring the pressure. The electronic circuit 8 is connected to the hydraulic sensor 6 so as to receive the measurement signals.

The channels include a measurement channel 14.3 which is configured to channel the liquid toward the hydraulic sensor 6. The hydraulic sensor 6 herein is joined to the measurement channel 14.3 via a conduit 6.14.

Furthermore, the delivery module 1 comprises the accumulator 22. The channels include a channel 14.4 configured to channel the liquid toward the accumulator 22. The channel 14.4 communicates with the measurement channel 14.3, because they are formed by a common cavity.

Moreover, the delivery module 1 comprises two joining members 24 arranged so as to join the pump 4 to the inlet channel 14.1 so that the liquid can flow from the inlet channel 14.1 toward the pump 4 through a joining member 24 and from the pump 4 toward the channel 14.2 through a joining member 24.

Each joining member 24 herein has generally a tubular shape. Each joining member 24 herein is secured to the pump 4. The channeling element 12.2 presents two through holes 26 which herein are rectilinear and which opens into the inlet channel 14.1 and the channel 14.2, so that each joining member 24 extends completely or partially in a respective through hole 26.

The cooperation of the joining members 24 with the through holes 26 allows for an assembly by simple stacking. Indeed, all it needs to the operator is to introduce the joining members 24 in the through holes 26 in order to fluidly connect the pump 4. For this purpose, the operator simply has to stack the channeling elements 12.1 and 12.2, and then the pump.

Since the delivery module 1 comprises several hydraulic components, in particular the pump 4, the valve 18, the hydraulic sensor 6 and the accumulator 22, the delivery module 1 comprises several joining members similar to the joining member 24, as well as several through holes 26, in order to fluidly connect the hydraulic components.

As regards the electrical connection, the pump 4 has two brushes 28, each forming a primary connecting member. In a complementary manner, the electronic circuit 8 has a secondary connecting member 30 which is configured to insert a respective brush 28. In the example of the figures, each secondary connecting member 30 comprises a leaf spring. Hence, each primary connecting member defines a male shape and each secondary connecting member defines a female shape.

Similarly, each hydraulic component of the delivery module may include a brush similar to the brushes 28 for electrical connections. The electronic circuit 8 comprises secondary connecting members for receiving these brushes.

The primary connecting members, herein formed by the brushes 28, and the secondary connecting members 30 are configured to be in contact when these primary and secondary connecting members are superimposed after superimposition along the superimposition direction Z12.

The channeling block 10 has passages 32 which open opposite secondary connecting members 30 and similars, so that each brush 28 and similars can pass through a passage and be inserted in a secondary connecting member 30. Thus, the electrical components of the pump 4 are electrically connected to the electronic circuit 8 by a direct connection through the channeling element 12.1 and 12.2 via passages 32. The pump 4 herein is placed at the other side of the channeling block 10 with respect to the electronic circuit 8.

During the assembly of the delivery module 1, the operator can electrically connect hydraulic components, including the pump 4, simply by stacking them on the channeling block 10. Hence, the insertion of the brushes 28 in the secondary connecting members 30 allows for a simple and error-free mounting.

The delivery module 1 herein comprises secondary connecting members 30, visible in FIG. 1. Each secondary connecting member 30 is electrically-conductive and configured to press against a respective brush, so as to guarantee an electrical contact between this brush and a corresponding secondary connecting member.

As shown in FIG. 2, in order to fasten the pump 4 to the channeling block 10, the delivery module 1 herein comprises self-drilling screws which are not represented (described for example in the standard DIN-7500). The operator can pass each self-drilling screw through dedicated openings, and then screw it in a tab 4.10 secured to the pump 4. The self-drilling screws are screwed parallel to the superimposition direction Z12.

As shown in FIG. 2, in order to fasten the accumulator 22 and the hydraulic sensor 6, the delivery module 1 comprises elastic snap-fit members 36 which hook complementary portions of the accumulator 22 and of the hydraulic sensor 6. The accumulator 22 and the hydraulic sensor 6 are displaced generally parallel to the superimposition direction Z12 during their snap-fitting.

Figure 12:
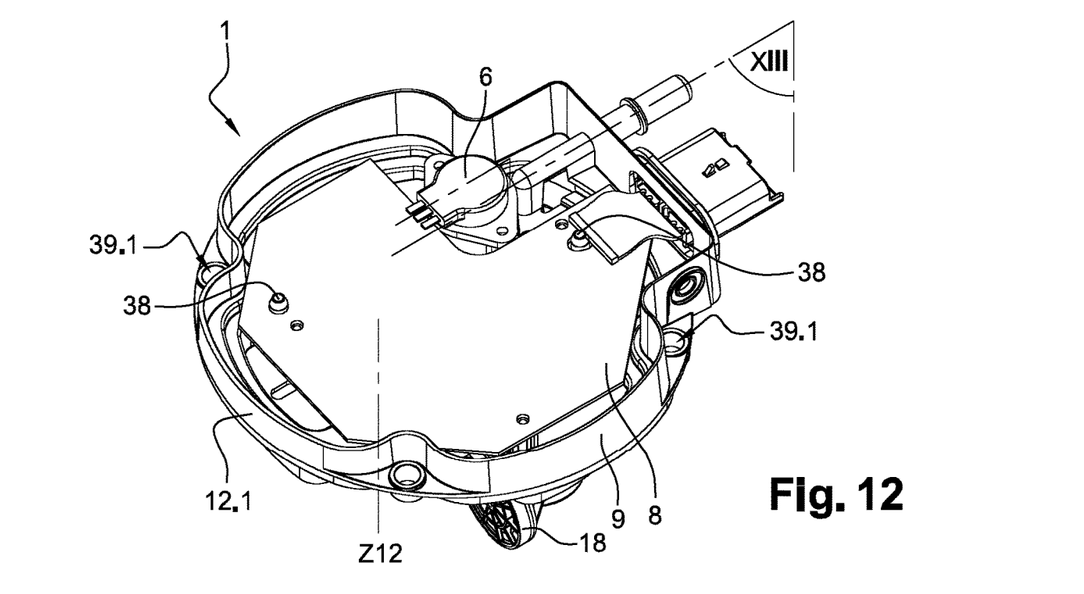
FIG. 12 is an assembled perspective view of a portion of a delivery module in accordance with a fourth embodiment of the invention.

As shown in FIG. 12, the delivery module 1 further comprises guiding members 38 which are configured to indicate the proper positioning and to guide each channeling element 12.1 and 12.2, the pump 4, the accumulator 22, the valve 18 and the hydraulic sensor 6 toward their respective assembled positions. After guiding by the guiding members, each channeling element 12.1 and 12.2, the pump 4, the accumulator 22, the valve 18 and the hydraulic sensor 6 are properly positioned with respect to each other.

Moreover, as shown in FIGS. 4 to 7, the delivery module 1 further comprises securing portions 39.2 which are configured to secure the delivery module 1 and the tank 101. The securing portions 39.2 herein are formed by screw passages disposed on the channeling element 12.2. Similarly, the channeling element 12.1 presents screw passages 39.1.

Thus, during the assembly of the tank assembly 100, an operator passes self-drilling screws in these screw passages 39.1 and securing portions 39.2, so as to screw these self-drilling screws in bosses which are not represented and which are provided in the tank 101.

When in service, the tank assembly 100 allows storing a liquid, herein an aqueous urea solution, in a motor vehicle. The tank assembly 100 comprises a tank 101, which is configured to contain the liquid, and the delivery module 1.

The tank 101 has a bottom 104 presenting i) a bottom opening 105 configured for the passage of the liquid and ii) a protruding portion 106 which is shaped protruding inwardly of the tank 101 so as to define a cavity external to the tank 101 under the protruding portion 106. The delivery module 1 is placed in the external cavity defined by the protruding portion 106, so that the pump 4 is fluidly connected to the bottom opening 105.

FIGS. 8 to 10 illustrate a delivery module 1 in accordance with a second embodiment. To the extent that the delivery module 1 of FIGS. 8 to 10 is similar to the delivery module 1 of FIGS. 1 to 7, the description of the delivery module 1 given hereinabove in relation to FIGS. 1 to 7 may be transposed to the delivery module 1 of FIGS. 8 to 10, with the exception of the notable differences set out hereinafter.

The delivery module 1 of FIGS. 8 to 10 differs from the delivery module 1 of FIGS. 1 to 7, in particular because the pump 4 of FIGS. 8 to 10 is located between the electronic circuit 8 and the channeling block 10. In other terms, the electronic circuit 8 is located above the pump 4 and the accumulator 22. Thus, the pump 4 of FIGS. 8 to 10 is placed at the same side of the channeling block 10 as the electronic circuit 8, unlike the pump 4 of FIGS. 1 to 7.

Because of this different positioning of the electronic circuit 8, the brushes 28 of FIGS. 8 to 10 do not pass through the channeling block 10, but they are connected directly on the electronic circuit 8. Similarly, the hydraulic sensor 6 of FIGS. 8 to 10 has a connecting portion 6.1, with brushes 28, which extends upwardly of FIGS. 8 to 10, while the hydraulic sensor 6 of FIG. 1 has a connecting portion 6.1 which extends downwardly of FIG. 1.

In the example of FIG. 8, all hydraulic components (pump 4, hydraulic sensor 6, valve 18 and accumulator 22) are located between the electronic circuit 8 and the channeling block 10.

FIG. 11 illustrates a delivery module 1 in accordance with a third embodiment. To the extent that the delivery module 1 of FIG. 11 is similar to the delivery module 1 of FIGS. 1 to 7, the description of the delivery module 1 given hereinabove in relation to FIGS. 1 to 7 may be transposed to the delivery module 1 of FIG. 11, with the exception of the notable differences set out hereinafter.

The delivery module 1 of FIG. 11 differs from the delivery module 1 of FIGS. 1 to 7, in particular because the channeling element 12.2 of FIG. 11 is formed by a flat gasket having openings defining the channels 14.1, 14.2, 14.3 and 14.4, while the channeling element 12.2 of FIGS. 1 to 7 is formed by a plate. Each of these openings is formed by a cut-out in the flat gasket. Each opening passes through the flat gasket.

Furthermore, the delivery module 1 of FIG. 11 differs from the delivery module 1 of FIGS. 1 to 7, because the delivery module 1 of FIG. 11 comprises a retaining member 40 which is configured to retain the flat gasket, which allows for a rapid assembly. The retaining member 40 herein is formed by a compression plate which compresses the flat gasket, so as to hold the flat gasket in place.

The lower face of the retaining member 40 substantially covers the upper face of the flat gasket. The channeling element 12.1 and the retaining member cover the opening forming the channels 14.1, 14.2, 14.3 and 14.4, delimiting the bottom and the top of each of the channels 14.1, 14.2, 14.3 and 14.4.

FIGS. 12 to 20 illustrate a delivery module 1 in accordance with a fourth embodiment. To the extent that the delivery module 1 of FIGS. 12 to 20 is similar to the delivery module 1 of FIGS. 1 to 7, the description of the delivery module 1 given hereinabove in relation to FIGS. 1 to 7 may be transposed to the delivery module 1 of FIGS. 12 to 20, with the exception of the notable differences set out hereinafter.

Figures 14, 15, 16, 17:
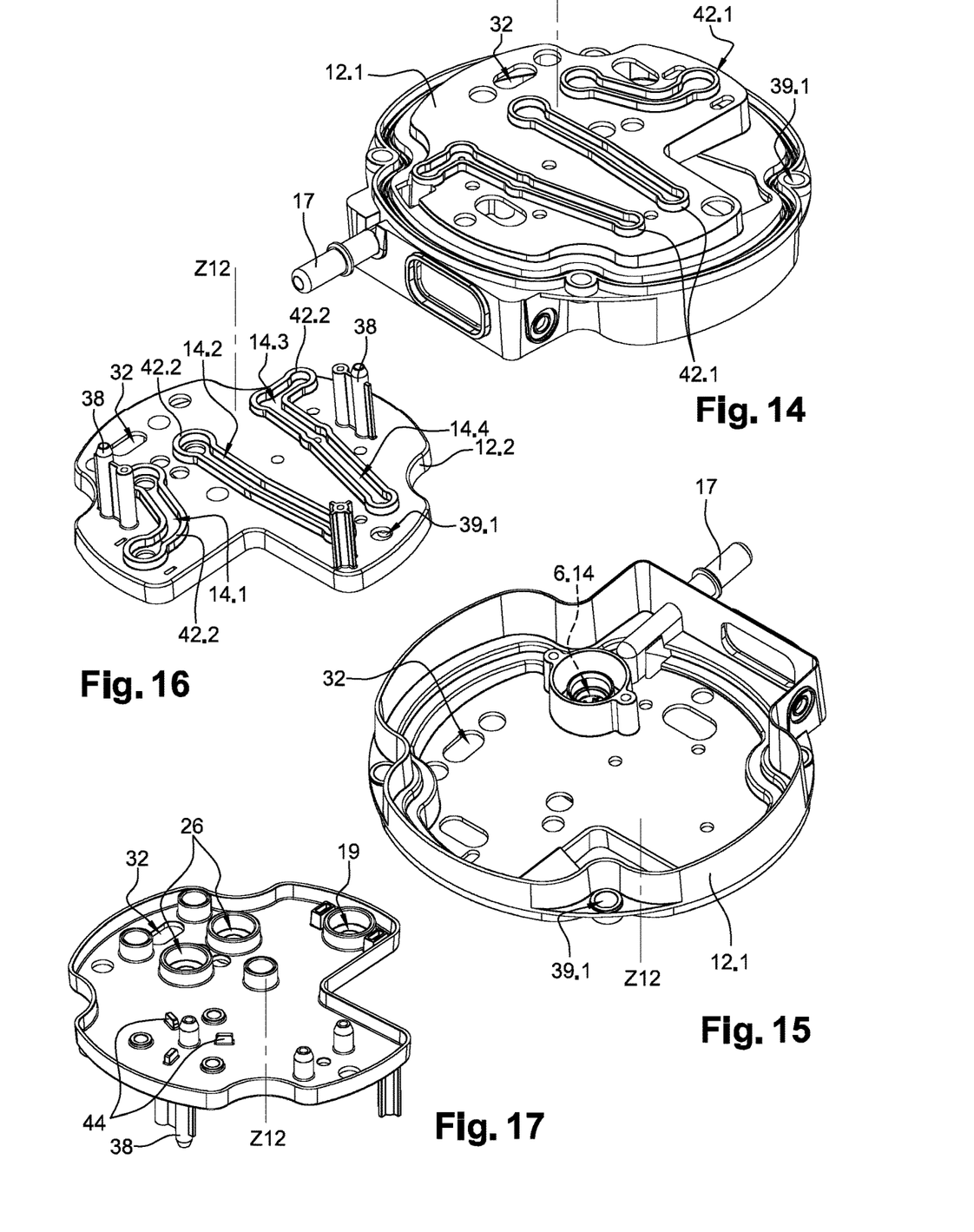
FIG. 14 is a perspective view of the upper face of a channeling element belonging to the delivery module of FIG. 12.
FIG. 15 is a perspective view of the lower face of the channeling element of FIG. 14.
FIG. 16 is a perspective view of the lower face of another channeling element belonging to the delivery module of FIG. 12.
FIG. 17 is a perspective view of the upper face of the channeling element of FIG. 16.

As shown in FIGS. 14 and 16, the delivery module 1 of FIGS. 12 to 20 differs from the delivery module 1 of FIGS. 1 to 7, in particular because:
  the channeling element 12.1 of FIGS. 12 to 20 includes protruding rims 42.1 each defining a closed contour; and
  the channeling element 12.2 of FIGS. 12 to 20 includes protruding rims 42.2 each defining a closed contour.

The protruding rims 42.1 and 42.2 achieve the same function as the weld beads 15 in the embodiment illustrated in FIGS. 1 to 7, namely defining channels 14.1, 14.2, 14.3 and 14.4.

Figures 18, 19:
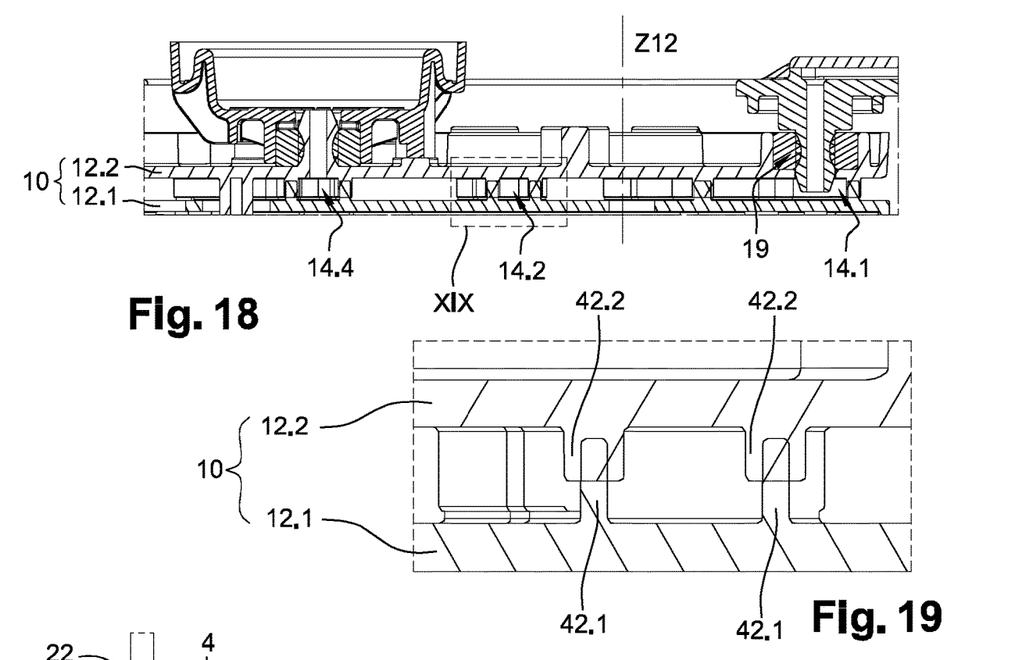
FIG. 18 is a section similar to FIG. 3 of a portion of the delivery module of FIG. 12.
FIG. 19 is a view at a larger scale of the detail XIX in FIG. 18.

The protruding rims 42.1 are positioned symmetrically with respect to the protruding rims 42.2. The protruding rims 42.1 have generally rectangular-shaped cross-sections. However, as shown in FIG. 19, the protruding rims 42.1 have dimensions different from the protruding rims 42.2 (in width and in height).

After assembly, for example by welding or bonding, the protruding rims 42.1 and 42.2 define channels 14.1, 14.2, 14.3 and 14.4 in a liquid-tight manner. In order to simplify the assembly of the delivery module 1, the protruding rims 42.1 and 42.2 may be respectively integral with the channeling elements 12.1 and 12.2.

Each protruding rim 42.1 or 42.2 extends over a respective planar portion. In other terms, the protruding rims 42.1 and 42.2 define, with planar portions of the corresponding faces of the channeling elements 12.1 and 12.2, the cavities which form the channels 14.1, 14.2, 14.3 and 14.4.

When the delivery module is in the assembled configuration (FIGS. 12, 13, 18), each protruding rim 42.1 can bear against a respective protruding rim 42.1, so as to close one of the channels 14.1, 14.2, 14.3 and 14.4 in a liquid-tight manner.

In the example of FIGS. 12 to 20, the protruding rims 42.1 and 42.2 may be welded to each other, so that the protruding rims 42.1 and 42.2 form weld beads after welding for example with heating blades.

As shown in FIG. 17, the delivery module 1 further comprises guiding members 44 which are configured to guide each channeling element 12.1 and 12.2 toward an assembled position. The guiding members 44 herein are formed by lugs. The delivery module 1 further comprises guiding members in the form of receivers which are not represented and which are adapted to receive the lugs. During the assembly, the guiding members 44 guide the movements of the operator when he places the components of the delivery module 1.

Figures 20, 21:
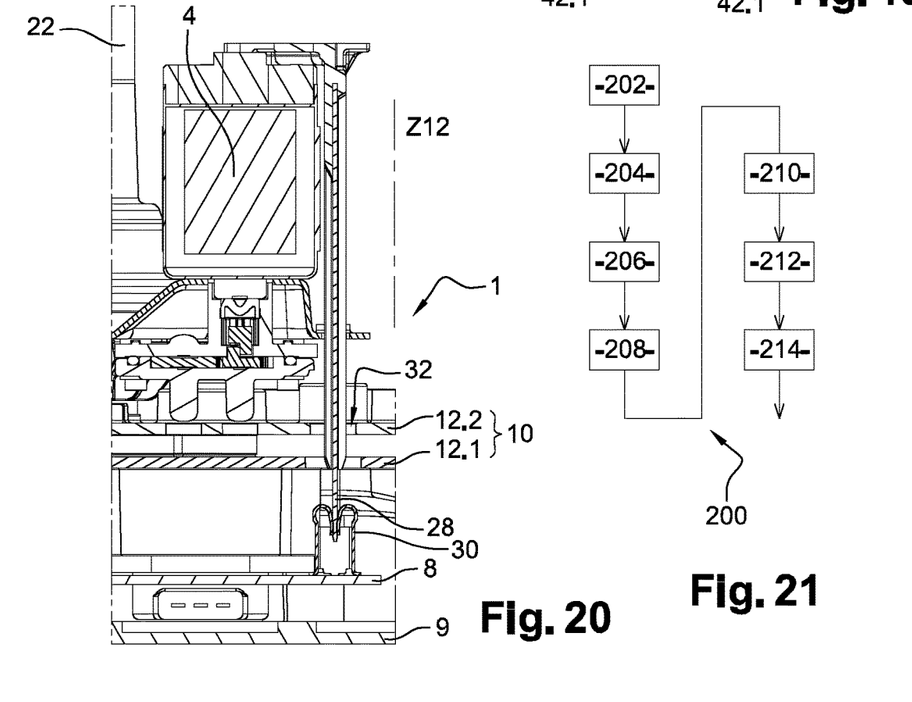
FIG. 20 is a section, along the plane XX in FIG. 13, illustrating a portion of the delivery module of FIG. 12.
FIG. 21 is a flow chart illustrating an assembly method in accordance with the invention.

FIG. 21 illustrates an assembly method 200 for assembling a delivery module 1. The assembly method 200 comprises the steps of:
  202) providing a delivery module 1,
  204) orientating the channeling elements 12.1 and 12.2 so as to position the channels 14.1, 14.2, 14.3 and 14.4,
  206) superimposing the channeling elements 12.1 and 12.2 along the superimposition direction Z12 so as to form the channeling block 10, and
  208) stacking the pump 4 along the superimposition direction Z12.

In the example of FIGS. 1 to 7, the assembly method 200 further comprises the steps of:
  210) joining the pump 4 to the inlet channel 14.1 and to the outlet channel 14.2 via the joining member 24 so that the liquid can flow from the inlet channel 14.1 toward the pump 4 through the joining member 24 and from the pump 4 toward the outlet channel 14.2 through the joining member 24, 212) passing each brush 28 (primary connecting members) through each passage 32, and 214) bringing each brush 28 (primary connecting members) into contact with a secondary connecting member 30.

The steps 210) to 214) allow for an assembly by simple stacking, because the fluidic joints and the electrical connections are also performed during stacking of the components of the delivery module 1.

In order to carry out step 212), the operator can simply plug each joining member 24 of the pump 4 to the inlet 14.1 and outlet 14.2 channels.

The assembly method 200 further comprises an initial step consisting in setting a channeling element 12.1 on a horizontal surface, so as to orientate vertically the superimposition direction Z12.

When the delivery module is in service, the liquid arriving from the tank 101 enters into the delivery module 1 via the inlet 19. In the delivery module 1, the liquid flows in the inlet channel 14.1, and then in the pump 4, and then in the outlet channel 14.2. Afterwards, the liquid can flow in the accumulator 22, and then reach the hydraulic sensor 6. Finally, the liquid comes out from the delivery module 1 via the fitting 17, and then flows in the downstream conduit 102.

When the delivery module 1 is in service during a brief purge step, the liquid enters into the delivery module 1 via the fitting 17, and then the liquid comes out from the delivery module 1 via the inlet 19 before returning in the tank 101.

Of course, the present invention is not limited to the particular embodiments described in the present patent application, nor is it limited to embodiments within the reach of those skilled in the art. Other embodiments may be considered without departing from the scope of the invention, from any element equivalent to an element indicated in the present patent application.

The invention claimed is:

1. A delivery module, for delivering a liquid from a tank toward a downstream conduit in a motor vehicle, the delivery module comprising at least:
    a pump configured to make the liquid flow from the tank toward the downstream conduit;
    an electronic circuit connected to the pump and configured to control the pump;
    a channeling block comprising two half channeling elements which are configured to define, when they are superimposed, at least two channels in which the liquid circulates, the channels including at least:
        i) an inlet channel configured to channel the liquid toward the pump, and
        ii) an outlet channel configured to channel the liquid coming out from the pump,
        wherein the channeling block includes a fitting configured to fluidly connect an outlet of the delivery module to the downstream conduit and an inlet for fluidly connecting the delivery module to the tank, and
        wherein one of the half channeling elements presents at least one cavity configured to define at least one of the channels, and wherein another half channeling element is configured to seal said cavity when the half channeling elements are superimposed, and
    two joining members arranged so as to join the pump to the inlet channel so that the liquid can flow from the inlet channel toward the pump through a joining member and from the pump toward the outlet channel through a joining member.

2. The delivery module according to claim 1, wherein each half channeling element has generally the shape of a plate.

3. The delivery module according to claim 1, wherein at least one half channeling element is formed by a flat gasket having at least one opening defining one of the channels, the delivery module further comprising at least one retaining member configured to retain the flat gasket.

4. The delivery module according to claim 1, wherein at least one half channeling element includes at least one protruding rim defining a closed contour.

5. The delivery module according to claim 1, further comprising at least one valve, the channels including a channel configured to channel the liquid toward the valve.

6. The delivery module according to claim 5, wherein the channel comprising the valve is configured to channel the liquid from the valve toward an accumulator.

7. The delivery module according to claim 1, further comprising a hydraulic sensor configured to generate measurement signals which are representative of a characteristic property of the liquid, the electronic circuit being connected to the hydraulic sensor so as to receive the measurement signals, the channels including a measurement channel configured to channel the liquid toward the hydraulic sensor.

8. The delivery module according to claim 1, wherein the pump comprises a primary connecting member, and wherein the electronic circuit comprises a secondary connecting member, the primary connecting member and the secondary connecting member being configured to be in contact when they are superimposed after superimposition along a superimposition direction, so that an electric current flows between the electronic circuit and the pump.

9. The delivery module according to claim 1, wherein the pump is located between the electronic circuit and the channeling block.

10. The delivery module according to claim 1, further comprising a guiding member configured to guide each half channeling element toward an assembled position.

11. The delivery module according to claim 1, wherein the liquid is an aqueous urea solution.

12. The delivery module according to claim 2, claim 1, wherein both of the two half channeling elements each comprise weld beads arranged around the at least one cavity defining the at least one channel, wherein the weld beads seal the at least channel when the two half channeling elements are superimposed and facing weld beads are welded together.

13. The delivery module according to claim 1, wherein the channeling block is located outside of the pump.

14. A delivery module, for delivering a liquid from a tank toward a downstream conduit in a motor vehicle, the delivery module comprising at least:
    a pump configured to make the liquid flow from the tank toward the downstream conduit;
    an electronic circuit connected to the pump and configured to control the pump;
    a channeling block comprising two channeling elements which are configured to define, when they are superimposed, at least two channels in which the liquid circulates, the channels including at least:
        i) an inlet channel configured to channel the liquid toward the pump, and
        ii) an outlet channel configured to channel the liquid coming out from the pump;
        wherein the channeling block includes a fitting configured to fluidly connect an outlet of the delivery module to the downstream conduit and an inlet for fluidly connecting the delivery module to the tank; and two joining members arranged so as to join the pump to the inlet channel so that the liquid can flow from the inlet channel toward the pump through a joining member and from the pump toward the outlet channel through a joining member;

wherein one of the channeling elements presents at least one cavity configured to define at least one of the channels, and wherein another channeling element is configured to seal said cavity when the channeling elements are superimposed; and wherein both of the two channeling elements each comprise weld beads arranged around the at least one cavity defining the at least one channel, wherein the weld beads seal the at least channel when the two channeling elements are superimposed and facing weld beads are weld together.

* * * * *